Dec. 10, 1957     B. N. ROBINS ET AL     2,815,883
SPIRALLY WOUND COVERING FOR POPCORN CONTAINERS
Filed Oct. 17, 1955     2 Sheets-Sheet 1

Betty N. Robins
Frederick C. Mennen
INVENTORS.

Dec. 10, 1957   B. N. ROBINS ET AL   2,815,883
SPIRALLY WOUND COVERING FOR POPCORN CONTAINERS
Filed Oct. 17, 1955   2 Sheets-Sheet 2
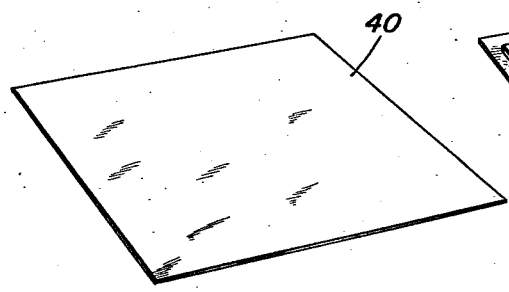
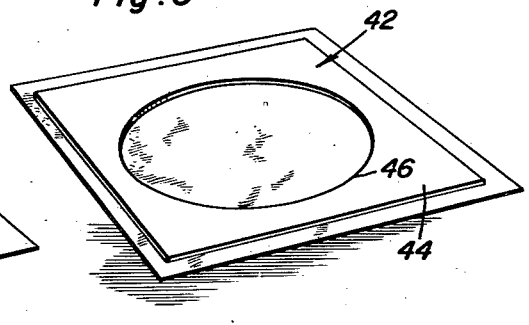
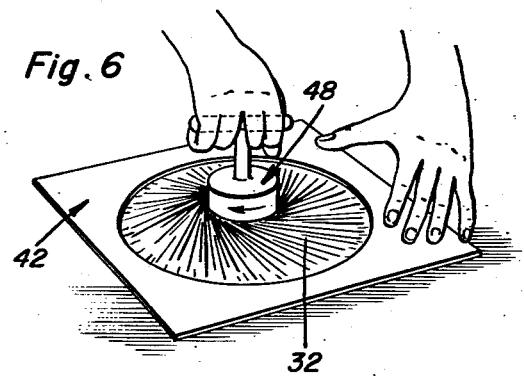
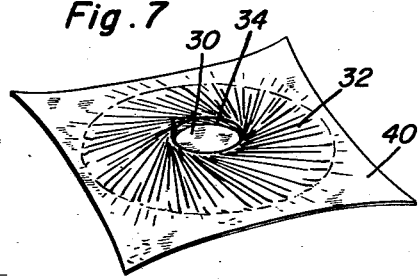
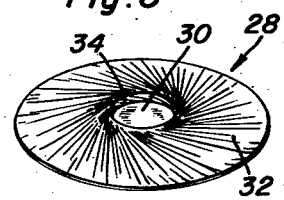
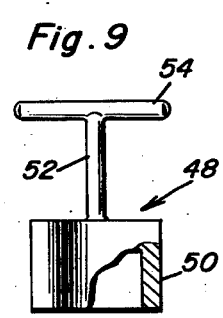
Betty N. Robins
Frederick C. Mennen
INVENTORS.
BY 0# United States Patent Office 2,815,883
Patented Dec. 10, 1957

2,815,883

SPIRALLY WOUND COVERING FOR POPCORN CONTAINERS

Betty N. Robins, Detroit, Mich., and Frederick C. Mennen, La Porte, Ind.

Application October 17, 1955, Serial No. 540,871

3 Claims. (Cl. 220—66)

This invention relates in general to new and useful improvements in container construction, and more specifically to an improved spirally wound covering for popcorn containers.

At the present time there is being marketed popcorn in packages ready for popping. Such packages include a suitable container, preferably formed of thin aluminum, which has disposed therein popcorn and a suitable fat. Closing the upper part of the container is a cover which is preferably formed of aluminum foil and which is folded or wrinkled so that the capacity of the container may be greatly increased by the billowing or unfolding of the cover as the popcorn is popped. Heretofore the cover for the popcorn container has been of such a nature whereby it is expanded or opened wholly by the striking of the exploded popcorn kernels thereagainst. This results in the compacting of the popcorn kernels and the resultant burning thereof.

It is therefore the primary object of this invention to provide an improved cover for popcorn containers which is so constructed whereby it occupies a relatively small space when placed upon a popcorn container and will open to greatly increase the effective size of the container, the cover being so formed whereby gases produced by the melting of the fat in which the popcorn is carried will cause the expanding or opening of the cover whereby sufficient space is provided for the popcorn kernels at all times during the popping operation.

Another object of this invention is to provide an improved cover for popcorn containers, the cover being spirally wound so as to eliminate any sharp folds which would resist the opening of the cover.

Still another object of this invention is to provide an improved cover for popcorn containers, the construction of the cover being of such a nature whereby it may be quickly and easily produced so that the cost of producing a cover is economically feasible.

A further object of this invention is to provide an improved method of forming a cover for popcorn containers, the method including the simple steps of providing a sheet of material, placing a pattern producing retainer over the sheet, and twisting the sheet through the use of a forming member whereby the sheet is automatically spirally folded to greatly reduce the size thereof.

These, together with other objects and advantages which will become subsequently apparent, reside in the details of construction and operation as more fully hereinafter described and claimed, reference being had to the accompanying drawings forming a part hereof, wherein like numerals refer to like parts throughout and in which:

Figure 4 is a perspective view of a sheet from which the cover is formed;

Figure 5 is a perspective view showing a pattern forming retainer positioned on the sheet as a first step in making the cover;

Figure 6 is a perspective view showing a forming member engaged with the center of the sheet in the center of the pattern, the forming member having been twisted about its axis to produce the spiral folds in the sheet;

Figure 7 is a perspective view of the sheet showing it after the spiral folds have been formed therein;

Figure 8 is a perspective view of the cover after it has been cut from the sheet; and Figure 9 is an enlarged elevational view of the forming member with a portion thereof broken away in order to clearly illustrate the details thereof.

Figure 1:
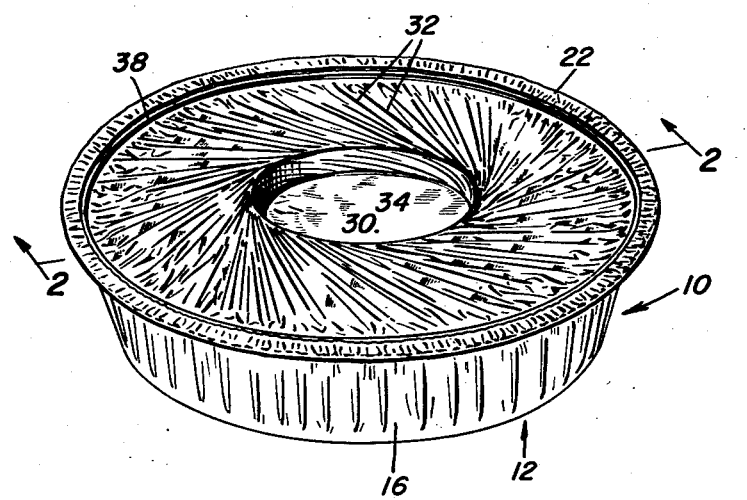
Figure 1 is a top perspective view of a popcorn container utilizing the cover which is the subject of this invention and shows the general arrangement of the details of the cover.

Referring now to the drawings in detail, it will be seen that there is illustrated a package of popcorn which is referred to in general by the reference numeral 10. The package 10 includes a pan which is referred to in general by the reference numeral 12. The pan 12 has a bottom wall 14 and an upstanding, outwardly sloping body portion 16. The body portion 16 terminates in an outwardly directed annular flange 18, a vertical flange 20 and a top annular flange 22, the flange 22 overlying the flange 18.

Disposed in the bottom portion of the container 12, which is preferably formed of aluminum, is a quantity of popcorn kernels 24 which is mixed with a suitable fat 26 to effect the proper cooking or popping of the popcorn kernels 24.

Closing the upper part of the container 12 is the cover which is the subject of this invention, the cover being referred to in general by the reference numeral 28. The cover 28 includes a central portion 30 which is central in outline. Surrounding the flat central portion 30 is a plurality of spirally arranged ribs or folds 32 which permit a relatively large quantity of material to be compacted into the relatively flat cover 28. The ribs 32 decrease in size outwardly from the center 30. It is to be noted that the inner ends of the folds 32 form an annular or circular wall 34 surrounding the central portion 30 and extending upwardly therefrom. The outer portions of the sheet forming the cover 28 are folded to form a rim 36.

Figure 2:
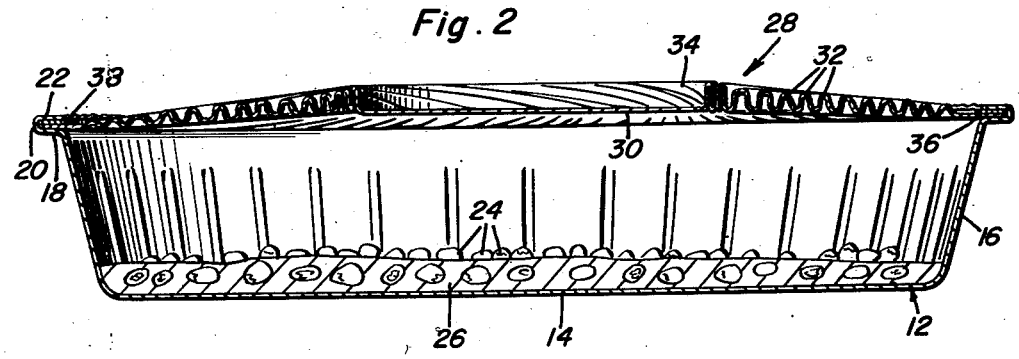
Figure 2 is an enlarged transverse vertical sectional view taken substantially upon the plane indicated by the section line 2—2 of Figure 1 and shows the specific details of the cover and the relationship thereof with respect to the popcorn container and the popcorn contained therein.

When the cover 28 is applied to the container 12, the flange 22 will be disposed as a continuation of the flange 20. The rim 36 is engaged over the flange 18 and then an annular gasket 38 is engaged over the rim 36. Last, the flange 22 is folded downwardly to the position illustrated in Figure 2 to lock the gasket 38 and the cover 28 in place.

Figure 3:
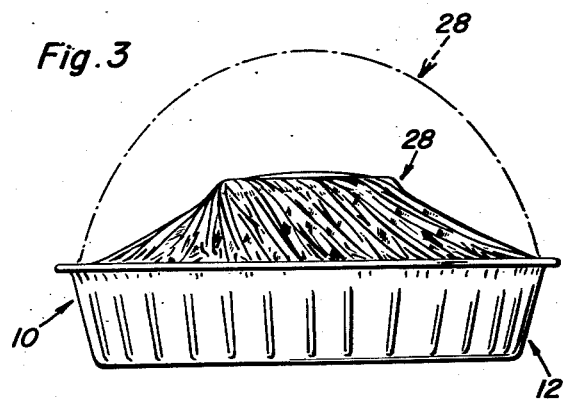
Figure 3 is a side elevational view on a reduced scale of the popcorn container and cover of Figure 1 and shows the cover in an initially expanded stage, the full expanded stage of the cover being shown by broken lines.

The package of popcorn 10 is to be placed over a suitable heat source in order to pop the popcorn kernels 24. As the fat 26 melts, it produces a gas which builds up within the container 12 and exerts a pressure against the underside of the cover 28. Inasmuch as the cover 28 contains no sharp folds, the central portion of the cover 30 rotates slightly so as to unwind and permit the folds 32 to open up. An initial stage of the opening of the cover 28 is illustrated in Figure 3. As the gases increase within the container 12, the cover 28 continues to open until it reaches the dotted line position of Figure 3. Inasmuch as the cover 28 is opened by the gases formed within the container 12, there is provided ample room for the kernels 24 to expand during popping. Thus, it is not necessary that the kernels 24 actually open the cover 28 and inasmuch as the kernels 24 are not confined in a small area, the possibility of burning the kernels and the finished popcorn is greatly reduced, if not entirely eliminated.

Referring now to Figures 4 through 8, inclusive, it will be seen that there is illustrated the steps in forming the cover 28. Initially the cover 28 is in the form of a flat sheet of material 40 which is preferably square and formed of aluminum foil, although other desired materials may be utilized. In order to shape the cover 28 to meet the shape of the container 12 and at the same time to hold the sheet 40 in place during the cover forming operation, there is provided a pattern forming retainer 42. The retainer 42 is in the form of a flat plate 44 which has a central circular opening 46 which is the pattern for making the cover 28.

Referring now to Figure 9 in particular, it will be seen that there is illustrated a forming member which is referred to in general by the reference numeral 48. The forming member 48 includes an inverted cup-shaped portion 50 which has extending upwardly therefrom a shank 52. The upper end of the shank 52 terminates in a handle 54.

After the pattern forming retainer 42 has been positioned as illustrated in Figure 5, the forming member 48 is positioned in the exact center of the opening 46. With pressure being applied simultaneously to the pattern forming retainer 42 and to the forming member 48, the forming member 48 is rotated through a slight angle. This results in the twisting of the central part of the sheet 40 about the forming member 48, as is best illustrated in Figure 6. As the sheet 40 is twisted, the spiral folds 32 are simultaneously formed.

Inasmuch as the folds 32 are tightly turned about the forming member 48, when the forming member 48 is lifted from its position in Figure 6, the central portion 30 is pulled upwardly out of the plane of the outer part of the sheet 40. Thus, when the pattern forming retainer 42 has been removed, the central portion of the sheet 40 which will become the cover 28 is slightly upwardly bowed in a manner best illustrated in Figure 2.

After the pattern forming retainer 42 has been removed from the sheet 40, a suitable die (not shown) is utilized to cut the cover 28 of a size to fit the container 12 from the sheet 40.

From the foregoing, the description of the method of forming the cover 28, it will be readily apparent that the forming operation is extremely simple so that the cover 28 may be economically manufactured. This is an important factor in providing a multiple product.

Although the method of forming the cover 28 has been illustrated as manually accomplished, it is to be understood that there may be provided suitable automatic mechanism for effecting the operations illustrated in Figures 4 through 8, inclusive, and described above. However, the same steps of forming the cover 28 will be followed and the principles will remain the same.

The foregoing is considered as illustrattive only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A cover for containers for popcorn and the like comprising a sheet of material having a flat central portion of circular outline, a folded outer portion in the form of a plurality of folds disposed in a spiral arrangement, and a flat rim portion for securement of said cover to a container, inner ends of said folds defining a vertical wall surrounding said central portion.

2. A cover for containers for popcorn and the like comprising a sheet of material having a flat central portion of circular outline, a folded outer portion in the form of a plurality of folds disposed in a spiral arrangement, and a flat rim portion for securement of said cover to a container, inner ends of said folds defining a vertical wall surrounding said central portion, said folds being vertically tapered and decreasing in depth towards said rim.

3. A cover for containers for popcorn and the like comprising a sheet of material having a flat central portion of circular outline, a folded outer portion in the form of a plurality of folds disposed in spiral arrangement, said folds being disposed in closely spaced side-by-side arrangement, and a flat rim portion for securement of said cover to a container, inner ends of said folds defining a vertical wall surrounding said flat central portion, said folds vertically tapering and decreasing in height toward said rim, each of said folds terminating at said rim and extending less than 360°.

References Cited in the file of this patent
UNITED STATES PATENTS

| | | |
|---|---|---|
| 1,890,936 | Douglass | Dec. 13, 1932 |
| 1,913,652 | Alexander | June 13, 1933 |
| 2,166,501 | MacCordy | July 18, 1939 |
| 2,312,637 | Fulenwider | Mar. 2, 1943 |
| 2,673,806 | Colman | Mar. 30, 1954 |